No. 639,012. Patented Dec. 12, 1899.
H. W. BOLENS.
CHAIR.
(Application filed July 17, 1899.)
(No Model.)
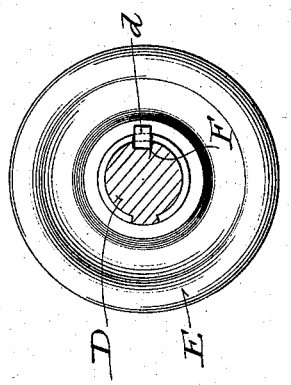
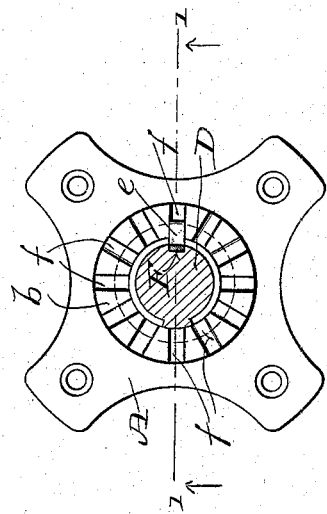
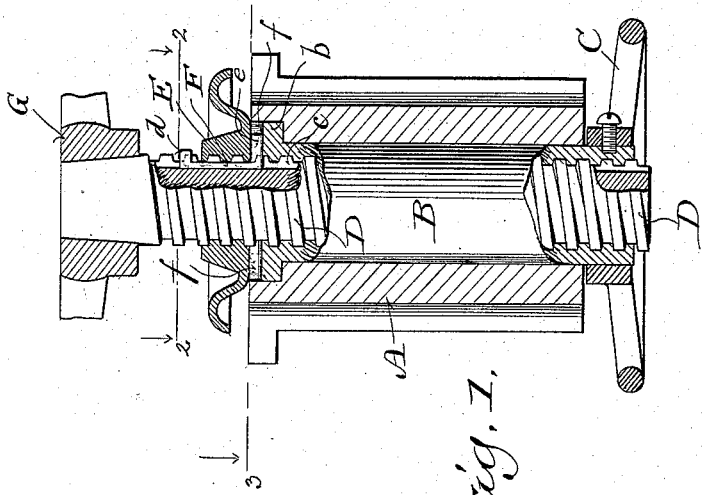
Witnesses:
Inventor
Harry W. Bolens,
By H. G. Underwood
Attorney

UNITED STATES PATENT OFFICE.

HARRY W. BOLENS, OF PORT WASHINGTON, WISCONSIN.

CHAIR.

SPECIFICATION forming part of Letters Patent No. 639,012, dated December 12, 1899.

Application filed July 17, 1899. Serial No. 724,080. (No model.)

*To all whom it may concern:*

Be it known that I, HARRY W. BOLENS, a citizen of the United States, and a resident of Port Washington, in the county of Ozaukee and State of Wisconsin, have invented certain new and useful Improvements in Chairs; and I do hereby declare that the following is a full, clear, and exact description thereof.

My invention relates to chairs such asembody vertically-adjustable seat-supports in their organization; and it consists in certain peculiarities of construction and combination of parts hereinafter particularly described with reference to the accompanying drawings and subsequently claimed, whereby the adjustment of said seat-supports is facilitated.

Figure 1 of the drawings illustrates an improved construction and arrangement of parts constituting one form of my invention, certain of said parts being shown broken and in section, this view being indicated by line 1 1 in the third figure. Figs. 2 and 3 of said drawings represent plan views, partly in horizontal section, these views being respectively indicated by lines 2 2 and 3 3 in the first figure; and Fig. 4, a detail view of a movable spline.

Referring by letter to the drawings, A represents a smooth-bore chair-base casting, and B a cylindrical nut that extends down through said casting. The upper end of the nut is provided with an exterior annular flange $b$, and the chair-base casting is counterbored to accommodate said flange. Detachably secured on the lower end of the nut by set-screws or otherwise is a hand-wheel C, and this hand-wheel prevents said nut and parts in connection therewith from being lifted out of the chair-base casting. Engaging the nut is a longitudinally-grooved screw-spindle D, and a correspondingly-tapped collar E has engagement with the spindle above the nut. The collar encircles a spline F, loose in the longitudinal groove $c$ of screw-spindle D, and right-angled extremities of this spline constitute a head $d$ and foot $e$ in opposition to the upper and lower edges of said collar.

The flanged end of the nut B is provided with radial notches $f$, any one of which may be engaged by the foot $e$ of spline F, whereby a union is had of said nut, the spindle D, and collar E, so that all three of these parts may turn together without disturbing the vertical adjustment of said spindle to which the seat-frame spider G of the chair is rigidly secured.

To vary elevation of the spindle D, the collar E is run up on the same to lift the spline F clear of nut B as far as may be necessary, after which said nut is operated, by means of its hand-wheel C, to raise or lower said spindle. The adjustment having been effected, the collar E is run down and the foot $e$ of spline F again engaged with a radial notch $f$ of the flanged end of nut B, where it is held fast by a further running down of said collar, it being possible to perform all of said operations with one hand, the length of said spline being sufficient, as herein shown, to permit a necessary amount of loose vertical play in spindle D at times independent of the aforesaid collar.

From the foregoing it will be understood that the seat and base portions of a chair embodying my improvements may be readily separated for knockdown shipment and storage.

While I have shown and described a simple economical construction and arrangement of parts constituting my invention organized to provide for operating the spindle-adjusting nut from underneath the chair-base casting, the organization may be otherwise and yet include the loose spline and screw-collar aforesaid in practically the same relation to each other and said nut as is herein particularly set forth.

Having thus described my invention, what I claim as new, and desire to secure by Letters Patent, is—

1. A chair-base casting, an indented nut supported by the casting, a longitudinally-grooved screw-spindle engaging the nut, a headed spline loose in the spindle-groove for engagement with the indented nut, and a screw-collar on the spindle in opposition to the head of the spline, provision being had for loose vertical play of said spline independent of the collar.

2. A chair-base casting, a nut supported by the casting and having one of its ends radially notched, a longitudinally-grooved screw-spindle engaging the nut, a spline loose in the spindle-groove and having right-angled extremities one of which is engageable with a nut-notch, and a screw-collar on said spindle between extremities of the spline, the latter having limited vertical adjustment independent of the collar.

3. A chair-base casting having a countersunk smooth bore, a cylindrical nut that engages the bore of the casting and is flanged at its upper end to rest in the countersink of said bore, a longitudinally-grooved screw-spindle engaging the nut, a nut-engaging headed spline loose in the spindle-groove, and a screw-collar on the spindle in opposition to the head of the spline, provision being had for loose vertical play of said spline independent of the collar.

In testimony that I claim the foregoing I have hereunto set my hand, at Milwaukee, in the county of Milwaukee and State of Wisconsin, in the presence of two witnesses.

HARRY W. BOLENS.

Witnesses:
N. E. OLIPHANT,
B. C. ROLOFF.